United States Patent [19]
Matsumoto

[11] Patent Number: 4,705,412
[45] Date of Patent: Nov. 10, 1987

[54] PROTECTION CIRCUIT FOR DRIVE TRANSISTOR OF PRINTER HEAD

[75] Inventor: Hisayoshi Matsumoto, Tokorozawa, Japan

[73] Assignee: Citizen Watch Co., Ltd., Tokyo, Japan

[21] Appl. No.: 820,702

[22] Filed: Jan. 21, 1986

Related U.S. Application Data

[63] Continuation of Ser. No. 562,410, Dec. 16, 1983, abandoned.

[30] Foreign Application Priority Data

Dec. 17, 1982 [JP] Japan ............................... 57-221390

[51] Int. Cl.⁴ ........................... B41J 27/26; B41J 3/20
[52] U.S. Cl. ...................................... 400/54; 400/125; 400/322; 400/719; 101/94; 318/473
[58] Field of Search ................. 400/54, 319, 322, 125, 400/323, 719; 318/473; 101/93.04, 94, 93.16

[56] References Cited

U.S. PATENT DOCUMENTS

| | | | |
|---|---|---|---|
| 3,660,718 | 5/1972 | Pinckaers | 318/473 X |
| 4,079,298 | 3/1978 | Prager | 400/323 X |
| 4,084,202 | 4/1978 | Stoll | 318/473 X |
| 4,422,781 | 12/1983 | Armfield et al. | 400/322 X |
| 4,426,604 | 1/1984 | Doeman et al. | 318/473 X |

FOREIGN PATENT DOCUMENTS

| | | | |
|---|---|---|---|
| 3125951 | 2/1982 | Fed. Rep. of Germany | 400/322 |
| 57732 | 12/1977 | Japan | 400/322 |
| 79185 | 6/1980 | Japan | 400/322 |
| 124684 | 9/1980 | Japan | 400/322 |
| 164483 | 12/1981 | Japan | 318/322 |
| 44782 | 1/1982 | Japan | 400/322 |
| 197178 | 12/1982 | Japan | 400/322 |
| 69070 | 4/1983 | Japan | 400/322 |
| 89383 | 5/1983 | Japan | 400/322 |

*Primary Examiner*—Edgar S. Burr
*Assistant Examiner*—James R. McDaniel
*Attorney, Agent, or Firm*—Koda and Androlia

[57] ABSTRACT

A drive circuit of a dot printer driving a head in horizontal reciprocating motion with respect to the feeding direction of the printing paper and impacting styluses arranged in a line toward the imprinting paper so that the requested character images can be formed on the paper which includes a comparator for comparing the drive electric current for the head drive motor with a reference value and for stopping the motor when the drive electric current exceeds the reference value and a temperature detecting element arranged in the vicinity of the drive transistor for the motor in order to detect the temperature of the transistor and to supply a temperature signal to the comparator in accordance with the current temperature of the transistor and to control the regulated value of the electric current in the comparator in accordance with the temperature fluctuation with such a drive circuit the drive electric current for the motor is controlled to be under a regulated value to protect the drive transistor, and the initial driving performance is improved by increasing the regulated value during the initial stage of motor driving.

3 Claims, 2 Drawing Figures

PROTECTION CIRCUIT FOR DRIVE TRANSISTOR OF PRINTER HEAD

The following application is a continuation of Ser. No. 06/562,410, filed Dec. 16, 1983, which was abandoned on May 23, 1986.

BACKGROUND OF THE INVENTION

1. Field of the Invention

This invention relates to a dot line printer and more particularly to a protection circuit for a drive transistor of a printer head in the dot line printer which reciprocates the head including a plurality of styluses perpendicularly transverse with respect to the feeding direction of the printing paper.

2. Prior Art

Such a dot printer is known that the stylus is impacted toward the printing paper in accordance with predetermined printing information so that the requested character images and others can be formed by a plurality of dots, and various types of the informational instruments adopt the dot line printer for output printing devices. It is also known that further improvement of such dot line printer is provided by a printer in which a plurality of styluses arranged along one line of the printing paper at an equal distance are driven in reciprocating motion over the stylus pitch to imprint on the paper being supplied to the normal direction with respect to such reciprocating motion, and which can perform line printing with extremely high speed and extensive volume. Since the moving portion in which a plurality of styluses are arranged along a line and drive to reciprocating motion over the stylus pitches is called the shuttle, this kind of printer is known as a shuttle type dot line printer.

In this type of printer, a DC motor is used to drive the head or the shuttle in reciprocating motion and a drive transistor driven by pulse signals or the like is utilized to control the rotation of the DC motor.

In the above mentioned prior art,, the reciprocating drive of the head or the shuttle with comparatively large load requires a considerable amount of electric power through the drive transistor. Therefore, when the load torque becomes extraordinarily large due to an increase of mechanical resistance or the like, the drive transistor will be easily destroyed by the flow of a sudden enormous amount of electric current.

Also, in prior art shuttle type dot line printers, if there is a sudden load increase on the print head, there is a substantial risk of damage to the printer itself before the drive transistor is destroyed. Such damage includes tearing of the ink ribbon or paper burning of the printing elements, etc. Such a sudden load can be caused by the breaking of the printing element, the seizure of a busing a paper jam, a ribbon jam, etc.

SUMMARY OF THE INVENTION

Accordingly, it is an object of the present invention to provide a protection circuit for a shuttle drive transistor of a dot line printer which can reliably protect the drive transistor in the motor circuit from destruction as well as improve the starting performance.

It is yet another object of the present invention to provide a protection circuit for a dot line printer which can reliably shut down the printer when a sudden load is applied to the print head to prevent damage to the printer itself.

In keeping with the principles of the present invention, the objects are accomplished with a protective circuit for a shuttle drive transistor of the dot line printer and for the protection of the printer itself including a comparator for comparing the drive electric current for the head drive motor with a referencwe value and for stopping the motor when the drive electric current exceeds the reference value and a temperature detecting element being arranged in the vicinity of the drive transistor for the motor in order to detect thé temperature and to supply a temperature signal to the comparator in accordance with the current temperature of the transistor and controlling the regulated value of the electric current in the comparator in accordance with the temperature fluctuation, whereby the drive electric current for the motor is controlled to be under the regulated value to protect the drive transistor, and the initial driving performance can be improved by an increase of the regulated value during the initial stage of motor driving.

DETAILED DESCRIPTION OF THE INVENTION

Figure 1:
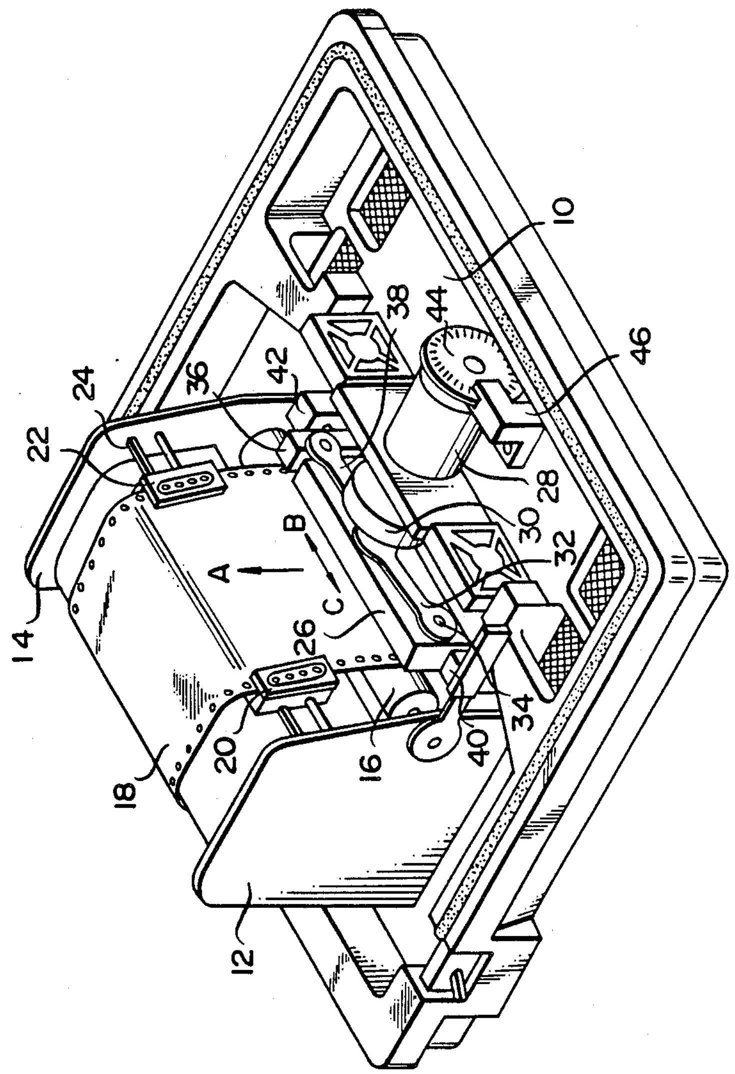
FIG. 1 is a perspective view showing a preferred embodiment of a shuttle type dot line printer which adopts the protection circuit in accordance with the teachings of the present invention.

Referring more particularly to the drawings, FIG. 1 shows a preferred embodiment of a shuttle type dot line printer adopting the teachings of the present invention. A platen 16 is pivotally mounted to side plates 12 and 14 which are fixed to a base frame 10, and printing paper 18 is installed along the surface of the platen 16. The printing paper 18 is held with paper guides 20 and 22 engaging with the edge sprocket perforations along the side margins of the paper, and rotation of an advance shaft 24 feeds the paper toward the direction of arrow A.

A shuttle 26 is prepared on the base frame 10 so that the shuttle 26 can be driven in horizontal reciprocating motion to the directions B and C perpendicular to the paper feeding direction A, and a plurality of styluses are arranged along a line in the shuttle 26 in order to impact toward the printing paper 18. The impact of the requested stylus toward the printing paper 18 linked with the reciprocating motion toward the B and C directions of the shuttle 26 enables simultaneous uniform imprinting along both directions (line directions) through an ink ribbon (not illustrated) in detail on the paper 18. Each of the stylus compositions and solenoid devices is not shown in detail in the Figures, but every stylus is composed in the same manner with one in a normal dot printer In order to drive the shuttle 26 in reciprocating motion in the directions B and C, on the base frame 10 is fixed a drive motor 28 consisting of a DC motor, etc. Its motor shaft has a flywheel 30 mounted thereon, and a crank shaft mechanism is prepared in front of the flywheel 30, although it is not illustrated in the Figures. Th crank shaft engages with a connecting rod mechanism 32. Since the other end of the connecting rod 32 engages with the shuttle 26 by the shaft 34, it is understood that the shuttle 26 is driven in reciprocating motion in the directions B and C through the crank mechanism including the connecting rod 32 in accordance with rotation of the drive motor 28.

The shuttle 26 mentioned above includes in its inside a plurality of styluses and stylus actuators to drive the stylus, the drive section of which is unitized as a hammer bank and is heavy. In the driving operation by the drive motor 28 there may be a problem which causes unnecessary oscillation (or vibration) or the like to the complete device because of its large inertia. In order to absorb this inertia the device is equipped with a counterweight 36 driven in reciprocating motion in the opposite direction to the shuttle 26. The counterweight 36 is coupled with the above mentioned crank mechanism by the second connecting rod 38. Accordingly, the shuttle 26 and the counterweight 36 move in opposite directions from each other, and the employment of the counter forces from each other can cancel the counter force arising from the force of inertia and acceleration to delete the generation of oscillation applied to the complete device. The shuttle 26 and the counterweight 36 mentioned above are pivotally held by supports 40 and 42 which are fixed to the base frame 10 so as to move along the directions B and C.

On the tail end of the motor 28 mounted thereon is a slit disc 44 and the position in the reciprocating motion of the shuttle 26 can be electrically detected by the slit disc 44 in cooperation with a photo-interrupter 46.

Figure 2:
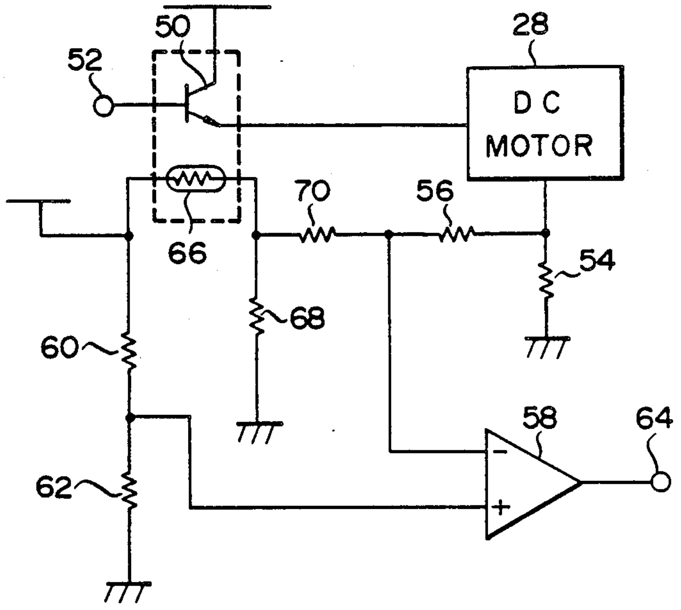
FIG. 2 is a circuit diagram showing a preferred embodiment of the protection circuit in accordance with the teachings of the present invention.

In FIG. 2 shown therein is a portion of a drive circuit for the motor 28. The drive electric current is supplied through the collector and emitter of a drive transistor 50 to the energizing coil of the motor 28, and the motor 28 is controlled by the drive input signal of pulses supplied to its base input 52. It is also possible that the input signal to the base input 52 can be any direct current controlling signal.

As mentioned above, the rotation of the motor 28 is controlled by the drive transistor 50. In this kind of motor driving circuit a comparativey large electric current flows through the drive transistor 50, and there may be a problem that a sudden increase of the electric current flowing through the transistor 50 caused by an extraordinary load increase destroys the transistor 50 itself and also causes damage to the printer itself. In order to protect the transistor 50 from such destruction and to prevent damage to the printer itself, in the present invention the drive electric current for the motor 28 is compared with a reference value and regulated to be under a predetermined electric current. In other words, the drive current of the motor 28 is detected as the voltage between both ends of a resistor 54 and it is supplied to the inverted input terminal of a comparator 58 by way of a resistor 56. On the other hand, the tapped value between resistors 61 and 62 is supplied to the noninverted input terminal of the comparator 58 as a reference value. Accordingly, when the motor driving electric current exceeds the regulated electric current determined by the reference value of the resistors 61 and 62, the comparator 58 outputs a stopping signal for stopping the motor 28 to a terminal 64 to switch off the above mentioned drive transistor 50, and the cut-off of the electric current reliably prevents the drive transistor 50 from destruction, especially from heat destruction, and prevents damage to the printer itself by the high speed operation of the protection circuit.

As mentioned hereinabove, according to the present invention, the drive electric current for the motor 28 can be always regulated to be under the predetermined electric current value, and the circuit can be well protected. In the shuttle type dot line printer, however, the motor 28 requires a large drive torque during its initial drive, and there arises a problem in that it is difficult to determine the reference value to be supplied to the above mentioned comparator 58. In other words, since the shuttle includes in its inside the hammer bank having a plurality of styluses which is comparatively heavy, the motor 28 requires a large drive torque during its initial driving stage. This necessary torque lowers rapidly as the shuttle 26 is continuously driven in reciprocating motion after the initial stage is over. Accordingly, when the reference value of the regulated electric current is determined on the basis of the necessary torque during the initial driving stage, there may be the problem of heat destruction of the drive transistor 50 due to the heating action of the transistor 50 during the continuous operation after the initial driving stage and the sensitivity to sudden load increases on the print head is reduced.

On the other hand, when the reference value is determined in accordance with the light load torque in normal operation, a sudden large electric current flow frequently stops the motor 28 during the large load torque required in its initial driving stage. In such initial driving stage of the motor 28 the drive transistor 50 is in the cool state and strong enough to resist heat destruction, but, on the other hand, in the continuous operation in which the transistor 50 is put in a comparatively high temperature state it is troublesome to stop the motor 28 frequently.

In the present invention, since in order to meet either case mentioned above the temperature in the vicinity of the drive transistor 50 is detected to be added to the reference value and the regulated electric current for the drive motor 28 is changed during the initial driving state or during the continuous operation, the protecting action can be extremely well performed in accordance with the real action.

In other words, in FIG. 2, a temperature detecting element, a thermistor 66 in the embodiment, is arranged in the vicinity of the drive transistor 50 in order to electrically detect the temperature in the vicinity of the transistor 50. The thermistor 66 is connected to a power source determining the reference value on one end an grounded by way of a resistor 68 on the other end. The voltage between both ends of the resistor 68 is supplied to the noninverted input of the above mentioned comparator 58 by way of a resistor 70 together with the motor drive electric current mentioned hereinabove.

Consequently, in this embodiment, both the motor drive electric current and the above mentioned temperature detecting signal are compared with the reference value. In the initial driving stage of the motor, in other words, during the cool state of the drive transistor, the temperature detecting signal is comparatively small so that the electric current flow does not exceed the reference value even if the motor drive electric current becomes larger and its regulated electric current can be substantially increased. Accordingly, in the initial driving stage of the motor when the initial electric current flows larger than the electric current in the continuous operation, there arise no such case which frequently happened in the prior art devices that the motor stops many times.

On the other hand, when the motor is driven in the continuous operation, as the temperature rises up in the transistor 50, the thermistor 66 increases the temperature detecting signal supplied to the comparator 58, and the regulated value of the drive electric current substantially decreases to the drive motor 28. Furthermore, the comparator 58 immediately outputs the signal to stop the motor 28 in such an extraordinary case that the drive electric current increases due to an abnormal increases of the load torque or the other external factors.

As described heretofore, according to the present invention, a change in the regulated value of the drive electric current between the cool state and hot state of the drive transistor performs the protecting action for the drive transistor and the printer itself extremely adequately for the operation of the dot printer and can achieve an extremely preferable protecting action without having complicated composition, since a single comparator can handle the regular electric current regulation and the temperature corrections to the value of the regulated electric current.

The shuttle type dot line printer is described in this embodiment, but this invention applies to the other type of dot printer in the same manner.

I claim:

1. A protection circuit for a shuttle type dot line printer comprising:

a shuttle drive motor for reciprocally driving a shuttle along a perpendicularly crossing direction with respect to the feeding direction of the printing paper;

a motor drive transistor for controlling the electric currents supplied to said shuttle drive motor;

a plurality of impacting styluses arranged in said shuttle so as to form requested character images on the printing paper;

a reference value setting means which outputs reference signal corresponding to a regulated value for the motor drive current;

a motor drive current detecting means which outputs detected signal of motor drive current;

reference value controlling means including a temperature detecting element disposed adjacently to the drive transistor for detecting the temperature of the drive transistor and for setting the reference value at a high level relative to the current detected signal at the initial stage of motor operation and at a lower level after the initial stage of motor operation said reference value controlling means being responsive to the resistance variation of said temperature detecting element; and a comparator for comparing the added value of said temperature detected signal and the drive current detected signal with said reference value to stop the drive motor when said added value exceeds the reference value;

whereby the drive current for the motor is controlled to be under the regulated value to protect the drive transistor and styluses, and the initial driving performance can be improved by an increase of the regulated value in the initial stage of motor driving.

2. A protection circuit for a printer according to claim 1, wherein said temperature detecting element is composed of a thermistor.

3. A protection circuit for a printer according to claim 2, wherein the temperature detecting signal is supplied to one input of said comparator together with a detected drive electric current which are compared with the reference value.

* * * * *